US011483549B2

(12) United States Patent
Hsiang

(10) Patent No.: US 11,483,549 B2
(45) Date of Patent: Oct. 25, 2022

(54) METHODS AND APPARATUSES FOR TRANSFORM SKIP MODE INFORMATION SIGNALING

(71) Applicant: MEDIATEK INC., Hsinchu (TW)

(72) Inventor: Shih-Ta Hsiang, Hsinchu (TW)

(73) Assignee: HFI INNOVATION INC., Zhubei (TW)

(*) Notice: Subject to any disclaimer, the term of this patent is extended or adjusted under 35 U.S.C. 154(b) by 0 days.

(21) Appl. No.: 16/952,255

(22) Filed: Nov. 19, 2020

(65) Prior Publication Data

US 2021/0160479 A1 May 27, 2021

Related U.S. Application Data

(60) Provisional application No. 62/984,821, filed on Mar. 4, 2020, provisional application No. 62/938,365, filed on Nov. 21, 2019.

(51) Int. Cl.
*H04N 19/103* (2014.01)
*H04N 19/172* (2014.01)
*H04N 19/176* (2014.01)
*H04N 19/70* (2014.01)

(52) U.S. Cl.
CPC ......... *H04N 19/103* (2014.11); *H04N 19/172* (2014.11); *H04N 19/176* (2014.11); *H04N 19/70* (2014.11)

(58) Field of Classification Search
None
See application file for complete search history.

(56) References Cited

U.S. PATENT DOCUMENTS 10,554,974 B2 2/2020 Hsiang
2021/0120231 A1* 4/2021 Yoo .................. H04N 19/12

FOREIGN PATENT DOCUMENTS

CN 104380734 A 2/2015
TW 201842769 A 12/2018

OTHER PUBLICATIONS

Chinese language office action dated Mar. 31, 2022, issued in application No. TW 109140730.

* cited by examiner

*Primary Examiner* — Christopher Braniff
(74) *Attorney, Agent, or Firm* — McClure, Qualey & Rodack, LLP

(57) ABSTRACT

Video processing methods and apparatuses in a video coding system include receiving input video data of a current block in a current picture, determining whether a transform skip mode is enabled for the current picture, signaling or parsing a syntax element associated with a size constraint for enabling the transform skip mode in a SPS referred to by the current picture when the transform skip mode is enabled, determining whether the transform skip mode is applied to the current block when the current block satisfies the size constraint, processing residues of the current block according to the transform skip mode when the transform skip mode is applied to the current block, and encoding or decoding the current block. An enabling flag is signaled in a high-level syntax set or parsed from the high-level syntax set to determine whether the transform skip mode is enabled for the current picture.

17 Claims, 6 Drawing Sheets

METHODS AND APPARATUSES FOR TRANSFORM SKIP MODE INFORMATION SIGNALING

CROSS REFERENCE TO RELATED APPLICATIONS

The present invention claims priority to U.S. Provisional Patent Application, Ser. No. 62/938,365, filed on Nov. 21, 2019, entitled "Methods and apparatus for signaling high-level information related to transform skip mode for coding image and video data", and U.S. Provisional Patent Application, Ser. No. 62/984,821, filed on Mar. 4, 2020, entitled "Methods and apparatus for signaling high-level information related to the transform skip mode". The U.S. Provisional Patent applications are hereby incorporated by reference in their entireties.

FIELD OF THE INVENTION

The present invention relates to video processing methods and apparatuses for encoding or decoding video data in a video encoding or decoding system. In particular, the present invention relates to transform skip mode information signaling for a video encoding or decoding system.

BACKGROUND AND RELATED ART

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which splits each video picture into multiple non-overlapped square Coding Tree Units (CTUs). Each individual CTU in a video picture or a slice is processed in a raster scanning order. In the HEVC main profile, the maximum and the minimum sizes of a CTU are specified by syntax elements signaled in a Sequence Parameter Set (SPS). A coded picture may be represented by a collection of slices, and each slice is composed of an integer number of CTUs. A Bi-predictive (B) slice may be decoded using intra prediction or inter prediction with at most two motion vectors and reference indices to predict sample values of each block in the B slice. A Predictive (P) slice is decoded using intra prediction or inter prediction with at most one motion vector and reference index to predict sample values of each block in the P slice. An Intra (I) slice is decoded using intra prediction only.

Each CTU is further recursively partitioned into one or more non-overlapped Coding Units (CUs) using quadtree (QT) splitting structure in order to adapt various local characteristics. At each partition depth of the QT splitting structure, an N×N block is either a single leaf CU or split into four smaller blocks with equal size N/2×N/2. The CTU with the size M×M pixel samples is the root node of a quadtree coding tree, and the four M/2×M/2 blocks are the child quadtree nodes split from the root node. Each of the four M/2×M/2 blocks may become a parent node partitioned by another QT splitting to result in four child nodes with further reduced size by half in each spatial dimension. If a coding tree node is not further split, it is called a leaf CU. The leaf CU size is restricted to be larger than or equal to a minimum allowed CU size, which is also specified in the SPS. An example of a recursive quadtree splitting structure for a CTU is illustrated in FIG. 1, where the solid lines indicate CU boundaries in the CTU.

Once the CTUs are partitioned into leaf CUs, each leaf CU is subject to further split into one or more Prediction Units (PUs) according to a PU splitting type for prediction according to the HEVC standard. Unlike the recursive quadtree splitting for CUs, each leaf CU may only be split once to form one or more PUs. The PU and associated CU syntax work as a basic representative block for sharing prediction information as the same prediction process is applied to all pixel samples in the PU. The specified prediction process is employed to predict the values of the associated pixel samples inside the PU. The prediction information is conveyed to the decoder on a PU basis. After obtaining residues generated by the prediction process based on the PU splitting type, the residues belonging to a leaf CU are partitioned into one or more Transform Units (TUs) according to a Residual QuadTree (RQT) splitting structure for transforming the residues into transform coefficients for compact data representation. The dashed lines in FIG. 1 indicate TU boundaries in the CTU. The TU is a basic representative block for applying transform and quantization on the residual data or transform coefficients. A TU is composed of a Transform Block (TB) of luminance (luma) samples of size 8×8, 16×16, or 32×32 or four TBs of luma samples of size 4×4, and two corresponding TBs of chroma samples in a picture coded by a 4:2:0 color format. For each TU, a transform matrix having the same size as the TU is applied to the residues to generate transform coefficients, and these transform coefficients are quantized and conveyed to the decoder on a TU basis. FIG. 2 illustrates an example of a corresponding QT representation for the block partitioning structure as shown in FIG. 1. The solid lines indicate CU boundaries and the dashed lines indicate TU boundaries within the CTU.

The terms Coding Tree Block (CTB), Coding block (CB), Prediction Block (PB), and TB are defined to specify two-dimensional (2-D) sample array of one color component associated with the CTU, CU, PU, and TU respectively. For example, a CTU consists of one luma CTB, two chroma CTBs, and its associated syntax elements. A similar relationship is valid for CU, PU, and TU. In the HEVC standard, the same quadtree splitting structure is generally applied to both luma and chroma components unless a minimum size for the chroma block is reached.

The Transform Skip (TS) mode is a coding tool that processes a quantized residual signal by entropy coding without going through the traditional transform operation. Residues of a block coded in the TS mode are encoded directly in a sample domain instead of transforming into a frequency domain. The TS mode is found to be particularly beneficial for screen content coding especially for regions with sharp edges and simple colors. The TS mode can be controlled by high level syntax elements, for example, an enabling flag transform_skip_enabled_flag signaled in a Picture Parameter Set (PPS) is used to indicate whether the TS mode is enabled or disabled, and a syntax element log 2_max_transform_skip_block_size_minus2 signaled in the PPS is used to signal a size constraint for enabling the TS mode. For example, the TS mode is only allowed to be applied to a transform block with a width and height smaller than or equal to 32 luma samples. In cases of the TS mode enabled for a current picture, a transform block level flag transform_skip_flag is signaled for each non-empty transform block satisfying the size constraint to indicate whether the TS mode is applied to the non-empty transform block. The size constraint is satisfied when the block width is less than or equal to 1<<(log 2_max_transform_block_size_minus2+2). The transform block is coded in the TS mode when the corresponding transform block level flag transform_skip_flag is equal to 1; otherwise the regular transform operation is applied to the transform block. The transform block level flag transform_skip_flag is inferred to be equal to 0 when this flag is not coded. Both dependent quantization and sign data hiding are disabled when the TS mode is applied to a transform block. Transform blocks coded in the TS mode are processed by a separate parsing process.

BRIEF SUMMARY OF THE INVENTION

Methods and apparatuses of video processing in a video encoding or decoding system for encoding or decoding video data in video pictures comprise receiving input data associated with a current block in a current picture, determining whether a transform skip mode is enabled for the current block, signaling or parsing a syntax element associated with a size constraint for enabling the transform skip mode only when the transform skip mode is enabled, and determining whether the transform skip mode is applied to the current block when the transform skip mode is enabled for the current block and the current block satisfies the size constraint for enabling the transform skip mode. The syntax element associated with the size constraint for enabling the transform skip mode is signaled in a Sequence Parameter Set (SPS) or parsed from a SPS, where the SPS is referred to by the current picture. The video processing methods then process residues associated with the current block according to the transform skip mode when the transform skip mode is applied to the current block, or process residues of the current block by a regular transform operation or regular inverse transform operation when the transform skip mode is not applied to the current block, and the video processing methods further encode or decode the current block in the current picture.

In some embodiments, the step of determining whether a transform skip mode is enabled for the current block includes parsing an enabling flag for the transform skip mode from a high-level syntax set, and the transform skip mode is enabled for the current block when the enabling flag is equal to 1. The transform skip mode is disabled for the current picture when the enabling flag is equal to 0. The high-level syntax set is one or a combination of the SPS, Picture Parameter Set (PPS), picture header, and slice header. In one embodiment, the video processing method further signals or parses a new syntax element in the SPS when the enabling flag is equal to 1. The new syntax element indicates whether a slice level syntax element is present in slice headers referring to the SPS, and the slice level syntax element for a current slice is used to determine parsing residues of transform skip blocks in the current slice by a regular residual coding process or transform skip residual coding process.

Some embodiments of the video processing method for the video encoding system further comprise signaling information related to a minimum allowed Quantization Parameter (QP) value associated with quantization of residues of transform blocks processed using the transform skip mode when the transform skip mode is enabled for the current picture. The information related to a minimum allowed QP value is signaled in the SPS. Similarly, some embodiments of the video processing method for the video decoding system further comprise parsing information related to a minimum allowed QP value associated with inverse quantization of a quantized residual signal of transform blocks processed using the transform skip mode when the transform skip mode is enabled for the current picture.

The syntax element associated with a size constraint for enabling the transform skip mode corresponds to information for deriving a maximum allowed block size for enabling the transform skip mode according to some embodiments of the present invention. For example, the maximum allowed block size for enabling the transform skip mode relates to a number of total pixel samples, a width, or a height of a block. In one embodiment, the maximum allowed block size for enabling the transform skip mode is less than or equal to a maximum allowed transform block size or a maximum allowed non-empty transform block size for coding transform blocks using the regular transform operation. Similarly, the maximum allowed block size for enabling the transform skip mode for chroma transform blocks is less than or equal to a maximum allowed transform block size or a maximum allowed non-empty transform block size for coding the chroma transform blocks using the regular transform operation.

In some embodiments, the syntax element associated with a size constraint for the transform skip mode signaled in the SPS is for luma transform blocks, and a size constraint for enabling the transform skip mode for chroma transform blocks is derived from the size constraint for enabling the transform skip mode for the luma transform blocks. For example, the size constraint for enabling the transform skip mode for the chroma transform blocks is set equal to a same value as the size constraint for enabling the transform skip mode for the luma transform blocks. In another example, the size constraint for enabling the transform skip mode for the chroma transform blocks is derived according to the size constraint for enabling the transform skip mode for the luma transform blocks and variables SubWdithC and SubHeightC indicating down-sampling ratios associated with chroma bitplanes in horizontal and vertical dimensions.

In one embodiment, the video processing method further comprises signaling a second syntax flag in a high-level syntax set or parsing a second syntax flag from a high-level syntax set when the transform skip mode is enabled for the current block. The second syntax flag is used to control whether one or more syntax elements related to the transform skip mode are present in a lower-level syntax set associated with each of lower-level video data units referring to the high-level syntax set. For example, the high-level syntax set is the SPS, a PPS, referred to by the current picture, or a picture header associated with the current picture, and the lower-level syntax set is a picture header associated with the current picture or a slice header associated with a current slice in the current picture. In one embodiment, the one or more syntax element related to the transform skip mode supposed to present in the lower-level syntax set are set to a default setting when the one or more syntax element are not signaled in the lower-level syntax set. For example, the default setting is derived from related parameters signaled in the high-level syntax set or the default setting is explicitly signaled by one or more syntax elements in the high-level syntax set.

Aspects of the disclosure further provide an apparatus implemented in a video encoding or decoding system, and the apparatus receives input video data of a current block in a current picture, determines whether a transform skip mode is enabled for the current block, signals or parses a syntax element associated with a size constraint for enabling the transform skip mode in a SPS referred to by the current picture when the transform skip mode is enabled, determines whether the transform skip mode is applied to the current block when the transform skip mode is enabled and the current block satisfies the size constraint for enabling the transform skip mode, processes residues associated with the current block according to the transform skip mode when the transform skip mode is applied to the current block or processes residues of the current block by a regular transform operation or regular inverse transform operation when the transform skip mode is not applied to the current block, and encodes or decodes the current block in the current picture.

In some embodiments, the video processing method in a video encoding or decoding system comprises receiving input video data of a current transform block in a current picture, signaling or parsing a first syntax element in a high-level syntax set referred to by the current picture to derive first information for indicating whether a transform skip mode is enabled for transform blocks in an associated video data structure referring to the high-level syntax set, signaling or parsing a second syntax element in the high-level syntax set when the first information indicates the transform skip mode is enabled for the transform blocks in the associated video data structure, determining whether the transform skip mode is applied to the current transform block when the first information indicates the transform skip mode is enabled, processing residues of the current transform block according to the transform skip mode when the transform skip mode is applied to the current transform block or processing residues of the current transform block by a regular transform operation or a regular inverse transform operation when the transform skip mode is not applied to the current transform block, and encoding or decoding the current transform block in the current picture. The second syntax element is related to a minimum allowed Quantization Parameter (QP) value associated with quantization of residues of the transform blocks coded using the transform skip mode. A QP value used for quantization of the residues of the current transform block is larger than or equal to the minimum allowed QP value when the transform skip mode is applied to the current transform block. Some embodiments of the high-level syntax set include one or a combination of a SPS, PPS, picture header, and slice header. In one embodiment, the video processing method further signals or parses a syntax element associated with a size constraint for enabling the transform skip mode in the high-level syntax set when the first syntax element indicates the transform skip mode is enabled, and determines the size constraint for enabling the transform skip mode according to the syntax element associated with the size constraint for enabling the transform skip mode. The step of determining whether the transform skip mode is applied to the current transform block in the current picture is performed only when the current transform block satisfies the size constraint for enabling the transform skip mode.

Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

Figure 1:
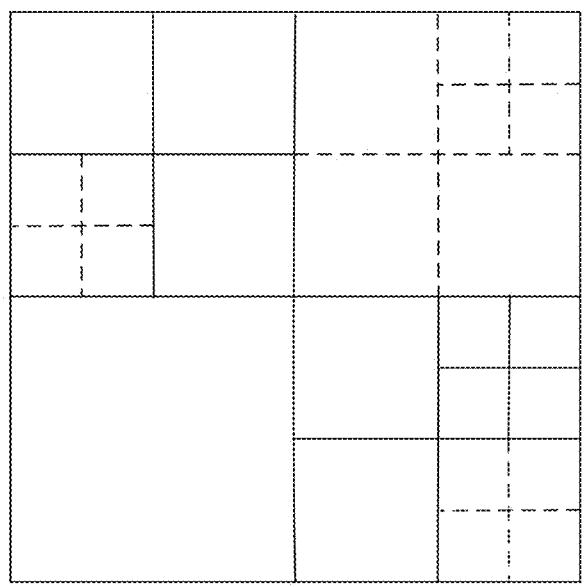
FIG. 1 illustrates an exemplary coding tree for splitting a Coding Tree Unit (CTU) into Coding Units (CUs) and splitting each CU into one or more Transform Units (TUs) according to a quadtree splitting structure.
Figure 2:
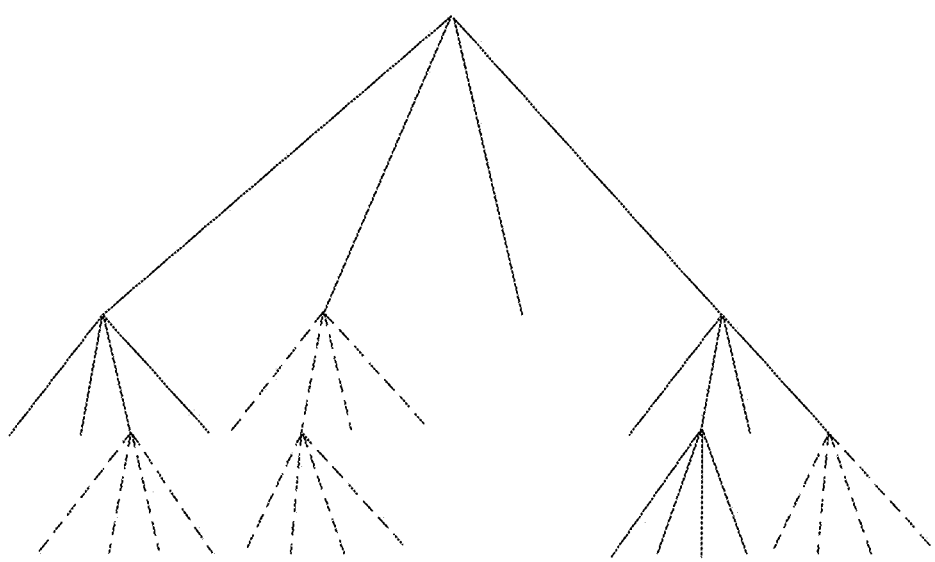
FIG. 2 illustrates a corresponding quadtree representation for the block partitioning structure as shown in FIG. 1.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The Joint Video Experts Team (JVET) of ITU-T SG16 WP3 and ISO/IEC JTC1/SC29/WG11 is currently in the process of establishing the next-generation video coding standard Versatile Video Coding (VVC). Some promising new coding tools have been adopted into the VVC standard, and in the VVC draft specification, a coded picture is partitioned into non-overlapped square block regions represented by CTUs, similar to the HEVC standard. Each CTU is partitioned into one or multiple smaller size CU by a quadtree with nested multi-type tree using binary and ternary split. The resulting CU partitions can be in square or rectangular shapes. The Transform Skip (TS) mode can be enabled by setting a Sequence Parameter Set (SPS) level enabling flag sps_transform_skip_enabled_flag in the SPS equal to 1, and a maximum allowed block size for enabling the TS mode is signaled by a syntax element log 2_max_transform_skip_block_size_minus2 in a Picture Parameter Set (PPS). Embodiments of the present invention improve coding efficiency and flexibility for implementing the transform skip mode in a video coding system.

Separate Transform Skip Mode Control for Chroma

In accordance with one aspect of the present invention, a video coder signals or parses one or more High-Level Syntax (HLS) elements for controlling the use of the TS mode for chroma transform blocks separately, in addition to the HLS elements associated with the luma transform blocks. In this way, a video encoder or decoder can more effectively control the use of the TS mode for different color components with different statistical characteristics.

In one embodiment, a video coder encodes or decodes first information for indicating whether the TS mode is enabled for luma transform blocks in a video data structure using one or more first syntax elements in the related high-level syntax structure such as the SPS, PPS, picture header, and slice header. The video coder further encodes or decodes second information for indicating whether the TS mode is enabled for chroma transform blocks in the video data structure using one or more second syntax elements in the related high-level syntax structure. In some embodiments of the present invention, the use of the TS mode can be controlled independently for the luma and chroma components. In one specific embodiment, the video coder is modified to signal two enabling flags sps_transform_skip_luma_enabled_flag and sps_transform_skip_chroma_enabled_flag in a SPS to indicate whether the TS mode is enabled for luma transform blocks and chroma transform blocks, respectively, in the coded video sequence that refers to the SPS. An exemplary high-level syntax table demonstrating an embodiment of the present invention is shown in Table 1, where ChromaArrayType!=0 indicates the number of the color components is more than 1 in the coded sequence that refers to the SPS. The TS mode is disabled for luma transform blocks or chroma transform blocks in the coded video sequence that refers to the SPS when the corresponding syntax element sps_transform_skip_luma_enabled_flag or sps_transform_skip_chroma_enabled_flag is equal to 0. The TS mode is enabled for luma transform blocks or chroma transform blocks in the coded video sequence that refers to the SPS when the corresponding syntax element sps_transform_skip_luma_enabled_flag or sps_transform_skip_chroma_enabled_flag is equal to 1.

TABLE 1

| | Descriptor |
|---|---|
| seq_parameter_set_rbsp( ) { | |
|     sps_decoding_parameter_set_id | u(4) |
|     sps_video_parameter_set_id | u(4) |
|     ..... | |
|     sps_transform_skip_luma_enabled_flag | u(1) |
|     if( ChromaArrayType != 0 ) | |
|         sps_transform_skip_chroma_enabled_flag | u(1) |
|     .... | |
| } | |

In some other embodiments, the use of the TS mode for the chroma components may be dependent on the use of the TS mode for the luma component in a video coding system. An embodiment of a video encoder or decoder infers that the TS mode for the chroma components is disabled when the TS mode is disabled for the luma component. For example, the video decoder disables the TS mode for a luma transform block after parsing a TS mode luma enabling flag which is equal to 0, and the video decoder also infers the TS mode for the corresponding chroma transform blocks is disabled when this TS mode luma enabling flag is equal to 0. In one specific embodiment, the video coder is modified to signal a first syntax flag sps_transform_skip_enabled_flag in a SPS to indicate whether the TS mode is enabled for luma transform blocks in the coded video sequence that refers to the SPS. When this SPS level TS enabling flag sps_transform_skip_enabled_flag is equal to 0, the TS mode is disabled for luma transform blocks in the coded video sequence that refers to the SPS. When this SPS level TS enabling flag sps_transform_skip_enabled_flag is equal to 1, the TS mode is enabled for luma transform blocks in the coded video sequence that refers to the SPS and the video coder further signals a second syntax flag sps_transform_skip_chroma_enabled_flag in the SPS to indicate whether the TS mode is enabled for chroma transform blocks. An exemplary high-level syntax table is shown in Table 2 demonstrates the controlling of the TS mode for the chroma components is depending on the controlling of the TS mode for the luma component. The syntax element sps_transform_skip_chroma_enabled_flag is inferred to be equal to 0 when this syntax element is not signaled, so that the TS mode is inferred to be disabled for the chroma transform blocks.

TABLE 2

| | Descriptor |
|---|---|
| seq_parameter_set_rbsp( ) { | |
|     sps_decoding_parameter_set_id | u(4) |
|     sps_video_parameter_set_id | u(4) |
|     ..... | |
|     sps_transform_skip_enabled_flag | u(1) |
|     if( sps_transform_skip_enabled_flag && | |
|     ChromaArrayType != 0 ) | |
|         sps_transform_skip_chroma_enabled_flag | u(1) |
|     .... | |
| } | |

Transform Skip Mode Size Constraint Signaling

In some embodiments, the video encoders or decoders signal information associated with a size constraint for enabling the TS mode using one or more syntax elements in one or more high-level syntax sets such as the SPS, PPS, picture header, and slice header when the TS mode is signaled to be enabled for transform blocks in a video data structure. The high-level syntax set is also referred to as a high-level parameter set. In one specific embodiment, information associated with a TS mode size constraint is signaled in or parsed from a SPS when a transform skip enabling flag signaled in or parsed from a high-level syntax set is equal to 1 indicating the TS mode is enabled. The high-level syntax set is one or a combination of a SPS, PPS, picture header, or slice header. For example, the transform skip enabling flag is signaled in the SPS. In some embodiments of the present invention, the size constraint for enabling the TS mode is related to information for deriving a maximum allowed block size for enabling the TS mode. In some other embodiments, information for deriving a maximum allowed block size for enabling the TS mode is signaled using one or more high-level syntax elements in the SPS, PPS, picture header, or slice header. The specified block size constraint may relate to the number of total pixel samples, width, or height of a block. In some embodiments, the maximum allowed block size for enabling the TS mode for TBs shall be less than or equal to a maximum allowed transform block size or a maximum allowed non-empty transform block size after zero-out TB for coding the TBs using the regular transform operation. In some embodiments, the maximum allowed block size for enabling the TS mode for chroma TBs shall be less than or equal to a maximum allowed transform block size or a maximum allowed non-empty transform block size after zero-out TB for coding the chroma TBs using the regular transform operation.

In some embodiments of the present invention, when the SPS level enabling flag sps_transform_skip_enabled_flag is equal to 1, the maximum allowed block size for enabling the TS mode is signaled by a syntax element log 2 max transform skip block size minus2 in the SPS. A syntax element sps_bdpcm_enabled_flag is further signaled to indicate whether the Block-based Delta Pulse Code Modulation (BDPCM) is enabled in the Coded Layered Video Sequence (CLVS) referring to the SPS. In one embodiment, two coding processes are supported for coding residual blocks in the TS mode when the value of the associated syntax element transform_skip_flag equal to 1. In cases when a syntax element slice_ts_residual_coding_disabled_flag in a slice header is equal to 0, a transform skip residual coding process with a syntax table specified by residual_ts_coding( ) is employed for coding residual blocks in the TS mode in the current slice. Otherwise when the syntax element slice_ts_residual_coding_disabled_flag is equal to 1, a regular residual coding process with a syntax table specified by residual_coding( ) is employed for coding residual blocks in the TS mode in the current slice.

In some embodiments, a size constraint for enabling the TS mode for chroma TBs is derived from a related size constraint for luma TBs signaled by one or more HLS elements. In a specific embodiment, a video encoder or decoder is modified to signal a syntax element sps_log 2_transform_skip_max_size_minus2 in a SPS when the SPS level TS enabling flag sps_transform_skip_enabled_flag is equal to 1. The maximum allowed block size in luma samples for enabling the TS mode for luma TBs is derived by (1<<(sps_log 2_transform_skip_max_size_minus2+2)). In one embodiment, the maximum allowed block size in chroma samples for enabling the TS mode for chroma TBs is set equal to the same value as that of for the luma TBs. In another embodiment, the maximum allowed block size in chroma samples for enabling the TS mode for chroma TBs is set equal to (1<<(sps_log 2_transform_skip_max_size_minus2+2))/SubWidthC for the block width and equal to (1<<(sps_log 2_transform_skip_max_size_minus2+2))/SubHeightC for the block height. The variables SubWidthC and SubHeightC indicate down-sampling ratios associated with the chroma bitplanes in horizontal and vertical dimensions, respectively. In another embodiment, the maximum allowed block size in chroma samples for enabling the TS mode for chroma TBs is set equal to a minimum of (1<(sps_log 2_transform_skip_max_size_minus2+2), 32/SubWidthC) for the block width and equal to a minimum of (1<<sps_log 2_transform_skip_max_size_minus2+2), 32/SubHeightC) for the block height. In yet another embodiment, the maximum allowed block size in luma samples for enabling the TS mode for chroma TBs is derived by (1<<(sps_log 2_transform_skip_max_size_minus2+2)). Table 3 and Table 4 provide exemplary syntax tables modified from Table 1 and Table 2, respectively, to further signal the maximum block size constraints for enabling the TS mode.

TABLE 3

|  | Descriptor |
|---|---|
| seq_parameter_set_rbsp( ) { |  |
|     sps_decoding_parameter_set_id | u(4) |
|     sps_video_parameter_set_id | u(4) |
|     ..... |  |
|     sps_transform_skip_luma_enabled_flag | u(1) |
|     if( ChromaArrayType != 0 ) |  |
|         sps_transform_skip_chroma_enabled_flag | u(1) |
|     if( sps_transform_skip_luma_enabled_flag \|\| |  |
|     sps_transform_skip_chroma_enabled_flag ) |  |
|         sps_log2_transform_skip_max_size_minus2 | ue(v) |
|     .... |  |
| } |  |

TABLE 4

|  | Descriptor |
|---|---|
| seq_parameter_set_rbsp( ) { |  |
|     sps_decoding_parameter_set_id | u(4) |
|     sps_video_parameter_set_id | u(4) |
|     ..... |  |
|     sps_transform_skip_enabled_flag | u(1) |
|     if( sps_transform_skip_enabled_flag ) { |  |
|       if( ChromaArrayType != 0 ) |  |
|         sps_transform_skip_chroma_enabled_flag | u(1) |
|       sps_log2_transform_skip_max_size_minus2 | ue(v) |
|     } |  |
|     .... |  |
| } |  |

In some embodiments, the size constraint for enabling the TS mode is respectively signaled for luma and chroma components using one or more separate HLS elements. Table 5 demonstrates an exemplary syntax table modified from Table 1 to further signal the maximum block size constraints for the luma and chroma components, respectively. The maximum allowed block size for enabling the TS mode for the luma component is derived by (1<<(sps_log 2_transform_skip_max_size_luma_minus2+2)) and the maximum allowed block size for enabling the TS mode for the chroma components is derived by (1<<(sps_log 2_transform_skip_max_size_chroma_minus2+2)).

TABLE 5

|  | Descriptor |
|---|---|
| seq_parameter_set_rbsp( ) { |  |
|     sps_decoding_parameter_set_id | u(4) |
|     sps_video_parameter_set_id | u(4) |
|     ..... |  |
|     sps_transform_skip_luma_enabled_flag | u(1) |
|     if( sps_transform_skip_luma_enabled_flag ) |  |
|         sps_log2_transform_skip_max_size_luma_minus2 | ue(v) |
|     if( ChromaArrayType != 0 ) { |  |
|         sps_transform_skip_chroma_enabled_flag | u(1) |

TABLE 5-continued

| | Descriptor |
|---|---|
|     if( sps_transform_skip_chroma_enabled_flag ) | |
|         sps_log2_transform_skip_max_size_chroma_minus2 | ue(v) |
|     } | |
|     .... | |
| } | |

Minimum Quantization Parameter for Transform Skip Mode

In some embodiments, a video encoder or decoder encodes or decodes first information for indicating whether the TS mode is enabled for transform blocks in an associated video data structure using one or more first syntax elements in one or more high-level syntax sets. The high-level syntax set is also referred to as a high-level parameter set. Some examples of the high-level syntax sets are SPS, PPS, picture header, and slice header. In cases when the first information indicates the TS mode is enabled for the transform blocks in the associated video data structure, the video encoder encodes second information related to a minimum allowed Quantization Parameter (QP) value associated with quantization of residues of the transform blocks in the TS mode by signaling one or more second syntax elements in the high-level syntax sets. Similarly, the video decoder decodes second information related to a minimum allowed QP value associated with inverse quantization of a quantized residual signal of the transform blocks in the TS mode by parsing one or more second syntax elements from the high-level syntax sets.

In one specific embodiment, the video encoder or decoder is modified to signal a first syntax flag sps_transform_skip_enabled_flag in a SPS to indicate whether the TS mode is enabled for transform blocks in the coded video sequence that refers to the SPS. In cases when the first syntax flag sps_transform_skip_enabled_flag is equal to 0, the TS mode is disabled for transform blocks in the coded video sequence that refers to the SPS. In cases when the first syntax flag sps_transform_skip_enabled_flag is equal to 1, the TS mode is enabled for transform blocks in the coded video sequence that refers to the SPS and the video coder further signals a second syntax element (for example, min_qp_prime_ts_minus4) in the SPS for derivation of the minimum allowed quantization parameter for the TS mode. An exemplary high-level syntax table of this embodiment is demonstrated in Table 6.

TABLE 6

| | Descriptor |
|---|---|
| seq_parameter_set_rbsp( ) { | |
|     sps_decoding_parameter_set_id | u(4) |
|     sps_video_parameter_set_id | u(4) |
|     ..... | |
|     sps_transform_skip_enabled_flag | u(1) |
|     if( sps_transform_skip_enabled_flag ) { | |
|         min_qp_prime_ts_minus4 | ue(v) |
|     .... | |
| } | |

Multiple Level Control for Transform Skip Mode

Various modified methods for signaling information at multiple levels related to coding residual blocks in the TS mode in an image or video coding system are disclosed. In one embodiment, when the TS mode is enabled in a high-level syntax set, one or more syntax elements can be further signaled in the high-level syntax set to control whether one or more syntax elements related to the TS mode shall be present in a lower-level syntax set associated with each of lower-level video data units referring to the high-level syntax set. The video encoder or decoder of this embodiment encodes or decodes a first syntax flag in a high-level syntax set to indicate whether the TS mode may be enabled for coding a high-level video data unit. The video encoder or decoder further encodes or decodes a second syntax flag in the high-level syntax set, and according to the second syntax flag, the video encoder or decoder adaptively encodes or decodes one or more syntax elements in a lower-level syntax set related to the TS mode for coding the associated lower-level video data units. When the value of the first flag indicates that the TS mode may be enabled for coding the high-level video data units, the video encoder or decoder further encodes or decodes the second syntax flag in the high-level syntax set. The video encoder or decoder encodes or decodes one or more syntax elements in the lower-level syntax set when the second syntax flag indicates the one or more syntax elements are present in the lower-level syntax set. For example, the high-level syntax set can be the SPS that applies to zero or more entire CLVSs or the PPS that applies to zero or more entire coded pictures, or the picture header that applied to all coded slices of a current picture in the VVC standard. The lower-level syntax set can be the picture header associated with the current coded picture or the slice header associated with the current coded slice in the VVC standard. The one or more syntax elements in the lower-level syntax set are set to a default setting when the one or more syntax elements are not signaled. In some embodiments, the default setting is derived by a predefined method. An example of the predefined method deriving the default setting from the related parameters in the high-level syntax set that is referred to by the current lower-level syntax set. In another example, the default setting is explicitly signaled by one or more syntax elements in the high-level syntax set that is referred to by the current lower-level syntax set. In this way, when a video encoder or decoder determines to adopt a fixed setting for luma mapping with chroma scaling for a high-level video data unit such as a CLVS, it can signal a second syntax flag in a high-level syntax set such as the SPS to indicate that the syntax information related to adaptively controlling the use of luma mapping with chroma scaling is skipped in a lower-level syntax set for each of lower-level video data units referring to the high-level syntax set.

A video encoder or decoder is modified according to another embodiment to signal or parse a new syntax element sps_ts_residual_coding_disabled_slice_present_flag in a SPS when a SPS level enabling flag sps_transform_skip_enabled_flag signaled in or parsed from the SPS is equal to 1. When this new syntax element sps_ts_residual_coding_disabled_slice_present_flag is equal to 1, a slice level syntax element slice_ts_residual_coding_disabled_flag is present in slice headers referring to the SPS through the referred PPS. When this new syntax element sps_ts_residual_coding_disabled_slice_present_flag is equal to 0, the slice level syntax element slice_ts_residual_coding_disabled_flag is inferred to be equal to 0 and is not present in slice headers referring to the SPS. The modified syntax tables for the SPS and slice header according to this embodiment are provided in Table 7 and Table 8 respectively.

TABLE 7

|  | Descriptor |
|---|---|
| seq_parameter_set_rbsp( ) { |  |
|     sps_seq_parameter_set_id | u(4) |
|     sps_video_parameter_set_id | u(4) |
|     ..... |  |
|     sps_transform_skip_enabled_flag | u(1) |
|     if( sps_transform_skip_enabled_flag ) { |  |
|         log2_transform_skip_max_size_minus2 | ue(v) |
|         sps_bdpcm_enabled_flag | u(1) |
|         sps_ts_residual_coding_disabled_slice_present_flag | u(1) |
|     } |  |
|     ..... |  |
| } |  |

TABLE 8

|  | Descriptor |
|---|---|
| slice_header( ) { |  |
|     picture_header_in_slice_header_flag | u(1) |
|     ..... |  |
|     if( sps_ts_residual_coding_disabled_slice_present_flag ) |  |
|         slice_ts_residual_coding_disabled_flag | u(1) |
|     ..... |  |
| } |  |

The related semantics for the syntax elements sps_ts_residual_coding_disabled_slice_present_flag and slice_ts_residual_coding_disabled_flag are shown in the following. The syntax element sps_ts_residual_coding_disabled_slice_present_flag equals to 1 specifying that the syntax element slice_ts_residual_coding_disabled_flag is present in the slice headers referring to the SPS. The syntax element sps_ts_residual_coding_disabled_slice_present_flag equals to 0 specifying that the syntax element slice_ts_residual_coding_disabled_flag is not present in the slice headers referring to the SPS. When this syntax element sps_ts_residual_coding_disabled_slice_present_flag is not present, it is inferred to be equal to 0. The syntax element slice_ts_residual_coding_disabled_flag equals to 1 specifying that the syntax structure residual_coding is used to parse the residual samples of a transform skip block for the current slice. The syntax element slice_ts_residual_coding_disabled_flag equals to 0 specifying that the syntax structure residual_ts_coding( ) is used to parse the residual samples of a transform skip block for the current slice. When this syntax element slice_ts_residual_coding_disabled_flag is not present, it is inferred to be equal to 0. The syntax structure residual_coding( ) parses the residual samples by the regular residual coding process while the syntax structure residual_ts_coding( ) parses the residual samples by the transform skip residual coding process.

In an alternative embodiment, when the syntax element sps_ts_residual_coding_disabled_slice_present_flag is equal to 0, a new syntax element sps_ts_residual_coding_disabled_slice_default_flag is further signaled in the SPS. When the syntax element slice_ts_residual_coding_disabled_flag is not present in the slice headers referring to the SPS, it is inferred to be equal to the value of the new syntax element sps_ts_residual_coding_disabled_slice_default_flag.

TABLE 9

|  | Descriptor |
|---|---|
| seq_parameter_set_rbsp( ) { |  |
|     sps_seq_parameter_set_id | u(4) |
|     sps_video_parameter_set_id | u(4) |
|     ..... |  |
|     sps_transform_skip_enabled_flag | u(1) |
|     if( sps_transform_skip_enabled_flag ) { |  |
|         log2_transform_skip_max_size_minus2 | ue(v) |
|         sps_bdpcm_enabled_flag | u(1) |
|         sps_ts_residual_coding_disabled_slice_present_flag | u(1) |
|         if (! sps_ts_residual_coding_disabled_slice_present_flag) |  |
|             sps_ts_residual_coding_disabled_slice_default_flag | u(1) |
|     } |  |
|     ..... |  |
| } |  |

TABLE 10

|  | Descriptor |
|---|---|
| slice_header( ) { |  |
|     picture_header_in_slice_header_flag | u(1) |
|     ..... |  |

TABLE 10-continued

| | Descriptor |
|---|---|
| if( sps_ts_residual_coding_disabled_slice_present_flag ) | |
|     slice_ts_residual_coding_disabled_flag | u(1) |
|     .... | |
| } | |

The related semantics for some of the syntax elements signaled in the SPS as shown in Table 9 are illustrated in the following. The syntax element sps_ts_residual_coding_disabled_slice_present_flag equals to 1 specifying that the syntax element slice_ts_residual_coding_disabled_flag is present in slice headers referring to the SPS. The syntax element sps_ts_residual_coding_disabled_slice_present_flag equals to 0 specifying that the syntax element slice_ts_residual_coding_disabled_flag is not present in the slice headers referring to the SPS. This syntax element is inferred to be equal to 0 when it is not present. The syntax element sps_ts_residual_coding_disabled_slice_default_flag specifies the default value for the syntax element slice_ts_residual_coding_disabled_flag when the syntax element sps_ts_residual_coding_disabled_sice_present_flag is equal to 0 for slice headers referring to the SPS.

The syntax element slice_ts_residual_coding_disabled_flag signaled in the slice header of a current slice as shown in Table 10 equals to 1 specifying that the syntax structure residual_coding is used to parse the residual samples of a transform skip block for the current slice. The syntax element slice_ts_residual_coding_disabled_flag equals to 0 specifying that the syntax structure residual_ts_coding( ) is used to parse the residual samples of a transform skip block for the current slice. This syntax element slice_ts_residual_coding_disabled_flag is inferred to be equal to the value of the syntax element sps_ts_residual_coding_disabled_slice_default_flag signaled in the SPS if the syntax element slice_ts_residual_coding_disabled_flag is not present in the slice header.

Adaptively Adjust Parametric Setting for Transform Skip Mode in Lower-Level Video Data Structure In accordance with another aspect of the present invention, a video coder signals or parses one or more syntax elements in one or more lower-level syntax structures for adaptively adjusting the parametric setting for controlling the use of the TS mode in lower-level video data structures. The lower-level syntax structure is also referred to as a lower-level syntax set. Some examples of the lower-level syntax structures are the PPS, picture header set, and slice header. In this way, the use of the transform skip mode can be more effectively controlled considering picture contents and coding conditions for encoding picture regions. In some embodiments of the present invention, a video encoder or decoder encodes or decodes one or more syntax elements in a high-level syntax set for signaling information for deriving the parametric setting for controlling the use of the TS mode in a high-level video data structure. The video coder further encodes or decodes one or more syntax elements in one or more lower-level syntax sets to indicate if the setting for controlling the use of the TS mode signaled in the high-level syntax set that is referred to by the lower-level syntax sets is to be reused or modified for encoding or decoding associated lower-level video data structures. The video encoder or decoder further encodes or decodes one or more syntax elements in one or more lower-level syntax sets for signaling information for deriving the modified parametric setting for controlling the use of the TS mode for encoding or decoding the associated lower-level video data structures. The video encoder or decoder may further encode or decode a syntax element in the high-level syntax structure to indicate if the setting for controlling the use of the TS mode signaled in a high-level syntax set is allowed to be modified or replaced in a particular lower-level syntax structure that refers to the high-level syntax set.

In one embodiment, the video coder is modified to encode or decode a syntax element sps_pic_transform_skip_present_flag in a SPS when the TS mode is enabled for transform blocks in the coded video sequence that refers to the SPS. When this syntax element sps_pic_transform_skip_present_flag is equal to 0 in the SPS, the parametric setting for the TS mode signaled in the SPS that is referred to by a current picture is applied to encode or decode the current picture. Otherwise, the parametric setting for the TS mode in the current picture can be further modified. The video encoder or decoder further encodes or decodes a syntax element pic_transform_skip_present_flag in a picture header of the current picture to indicate if the parametric setting for the TS mode signaled in the SPS that is referred to by the current picture is reused for encoding or decoding the current picture. The syntax element pic_transform_skip_present_flag is referred to be equal to 0 when this syntax element is not present. Exemplary syntax tables shown in Table 11 and Table 12 illustrate an embodiment of supporting the modified parametric setting for controlling the use of the TS mode in a lower-level video data structure. In this embodiment, the high-level syntax structure for signaling syntax elements associated with the control of the parametric setting for the TS mode is a SPS and the lower-level syntax structure for signaling syntax elements associated with the control of the parametric setting for the TS mode is a picture header. The syntax element pic_transform_skip_enabled_flag signaled in the picture header specifies if the TS mode can be enabled in the current picture, and the syntax element pic_log 2_transform_skip_max_size_minus2 signaled in the picture header plus 2 specifies the maximum allowed transform block size for enabling the TS mode in the current picture. In cases when the syntax element pic_transform_skip_present flag is equal to 0, the values of the syntax element pic_transform_skip_enabled_flag and pic_log 2_transform_skip_max_size_minus2 are inferred to be equal to values of associated SPS level syntax elements sps_transform_skip_enabled_flag and sps_log 2_transform_skip_max_size_minus2, respectively. The associated SPS level syntax elements are signaled in the SPS that is referred to by the current picture header by referring to the PPS that refers to the SPS.

TABLE 11

| | Descriptor |
|---|---|
| seq_parameter_set_rbsp( ) { | |
|     sps_decoding_parameter_set_id | u(4) |
|     sps_video_parameter_set_id | u(4) |
|     ..... | |

TABLE 11-continued

| | Descriptor |
|---|---|
| sps_transform_skip_enabled_flag | u(1) |
| if( sps_transform_skip_enabled_flag ) { | |
|     sps_pic_transform_skip_present_flag | u(1) |
|     sps_log2_transform_skip_max_size_minus2 | ue(v) |
| } | |
| .... | |
| } | |

TABLE 12

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue(v) |
|   ph_pic_parameter_set_id | ue(v) |
| ..... | |
|   if( sps_pic_transform_skip_present_flag ) { | |
|     pic_transform_skip_present_flag | u(1) |
|     if ( pic_transform_skip_present_flag ) { | |
|       pic_transform_skip_enabled_flag | u(1) |
|       if( pic_transform_skip_enabled_flag ) | |
|         pic_log2_transform_skip_max_size_minus2 | ue(v) |
|     } | |
|   } | |
| .... | |
| } | |

Exemplary Flowcharts

Figure 3:
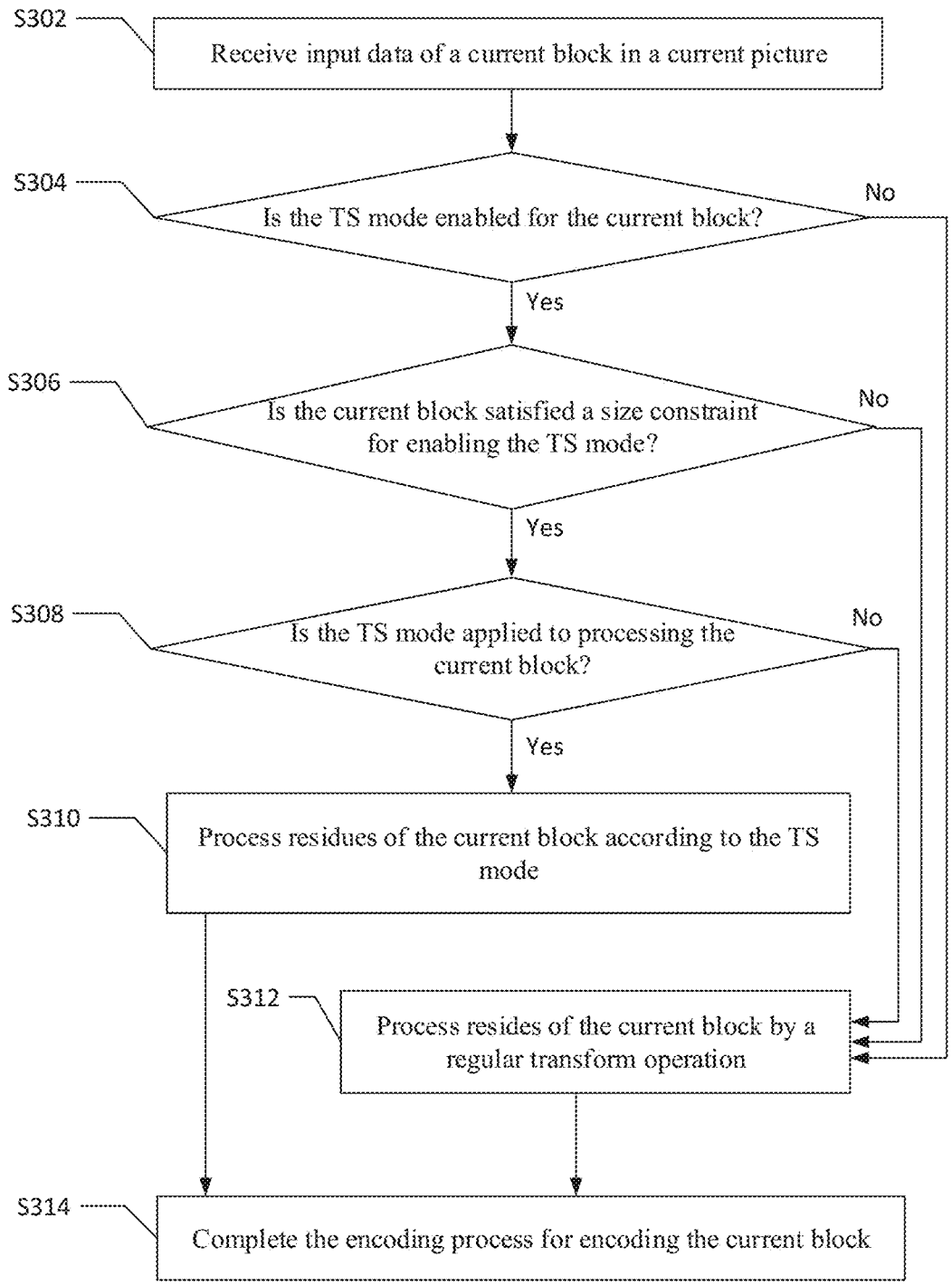
FIG. 3 is a flowchart illustrating an embodiment of the video processing method for encoding a current block in a current picture by signaling a syntax element associated with a size constraint for enabling the transform skip mode in a SPS only when the transform skip mode is enabled for the current picture.

FIG. 3 is a flowchart illustrating an exemplary embodiment of the video processing method implemented in a video encoding system. The video encoding system in this exemplary embodiment first receives input data associated with a current block in a current picture in step S302. The video encoding system determines if the TS mode is enabled for the current block in step S304. For example, an enabling flag is signaled in a high-level syntax set referred to by the current picture, and the enabling flag is set to 1 to indicate the TS mode is enabled for one or more pictures associated with the high-level syntax set. The high-level syntax set may be one or a combination of a SPS, PPS, and picture header referred to by the current picture. The video encoding system signals a syntax element associated with a size constraint for enabling the TS mode in the SPS referred to by the current picture when the TS mode is enabled. The video encoding system checks if the current block satisfies the size constraint for enabling the TS mode in step S306, and only when the TS mode is enabled for the current block and the current block satisfies the size constraint, the video encoding system determines whether the TS mode is applied to the current block in step S308. Residues of the current block are processed according to the TS mode in step S310 when the TS mode is applied to the current block; otherwise, residues of the current block are processed by a regular transform operation in step S312 when the TS mode is not applied to the current block. The regular transform operation in step S312 is selected to process the residues of the current block when the TS mode is not enabled for the current block in step S304 or when the current block does not satisfy the size constraint for enabling the TS mode in step S306. The video encoding system encodes the current block in step S314.

Figure 4:
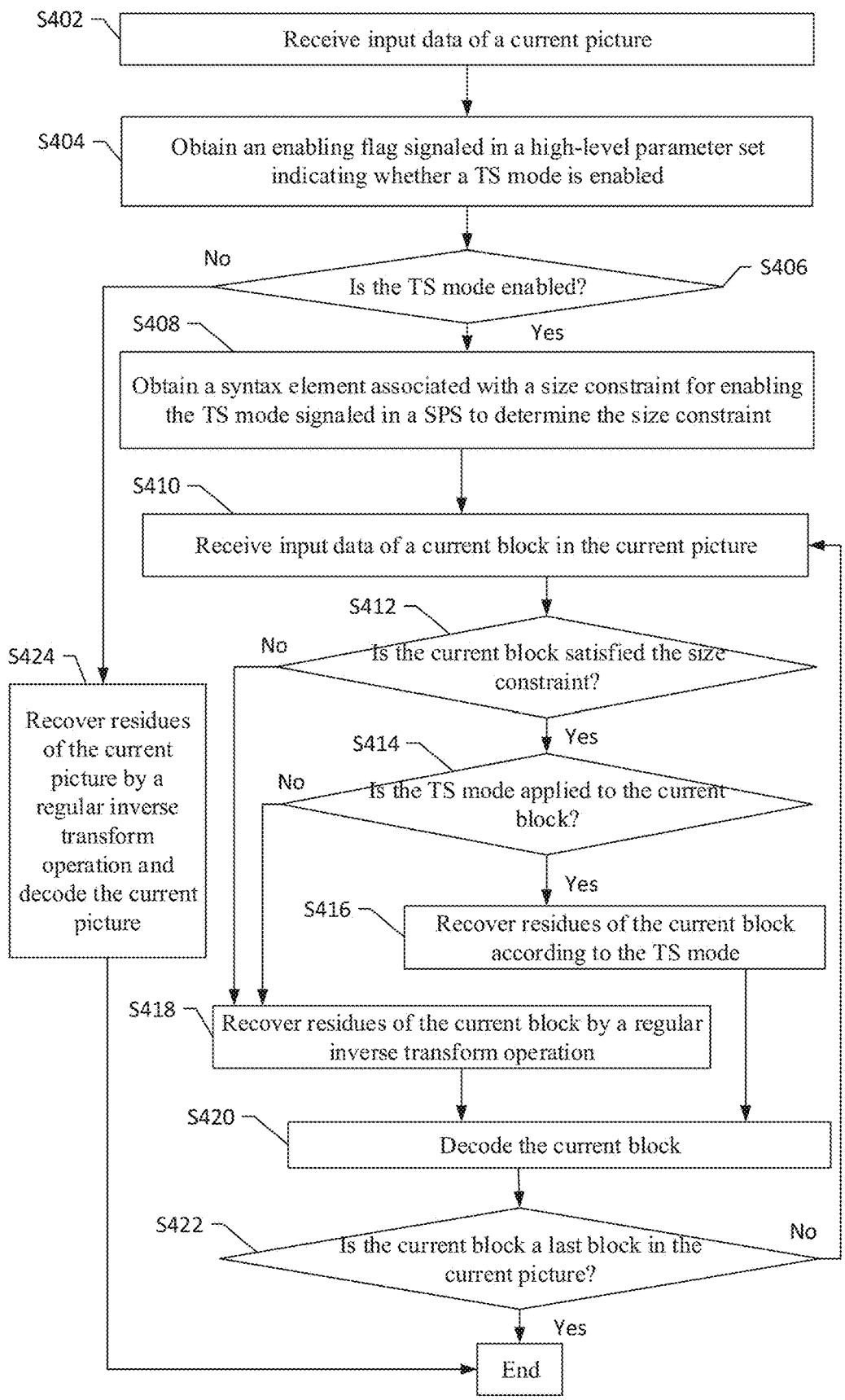
FIG. 4 is a flowchart illustrating an embodiment of the video processing method for decoding a current picture by parsing a syntax element associated with a size constraint for enabling the transform skip mode in a SPS only when the transform skip mode is enabled for the current picture.

FIG. 4 is a flowchart illustrating an exemplary embodiment of the video processing method implemented in a video decoding system. The video decoding system in this exemplary embodiment receives input video data of a current picture in step S402, and obtains an enabling flag signaled in a high-level syntax set indicating whether a TS mode is enabled in step S404. The high-level syntax set may be one or a combination of a SPS, PPS, picture header, and slice header referred to by the current picture or associated to the current picture. In step S406, the video decoding system determines if the TS mode is enabled according to the enabling flag obtained from step S404. The video decoding system further obtains a syntax element associated with a size constraint for enabling the TS mode signaled in a SPS referred to by the current picture in step S408 when the TS mode is enabled. The video decoding system receives input video data associated with a current block in step S410, and checks whether the current block satisfies the size constraint for enabling the TS mode in step S412 when the TS mode is enabled for the current picture. For example, the size constraint is related to a maximum allowed block size, and the TS mode can only be applied to the current block when a size of the current block is smaller than or equal to the maximum allowed block size. In cases when the current block satisfies the size constraint, the video decoding system determines if the TS mode is applied to the current block in step S414. For example, the video decoding system determines if the TS mode is applied to the current block according to a block-level syntax element. Residues of the current block are recovered according to the TS mode in step S416 if the TS mode is applied to the current block; otherwise, residues of the current block are recovered by a regular inverse transform operation in step S418 if the TS mode is not applied to the current block in step S414 or when the current block does not satisfy the size constraint in step S412. The video decoding system decodes the current block in step S420 and checks if the current block is a last block in the current picture in step S422. The video decoding system repeats the steps from step S410 to step S420 to process each subsequent block in the current picture if the current block is not the last block; otherwise the video decoding system processes a subsequent picture referring to the same high-level syntax set. Residues of the current picture are recovered by a regular inverse transform operation and the current picture is decoded in step S424 when the TS mode is not enabled for coding the current picture in step S406.

Exemplary System Block Diagrams

Figure 5:
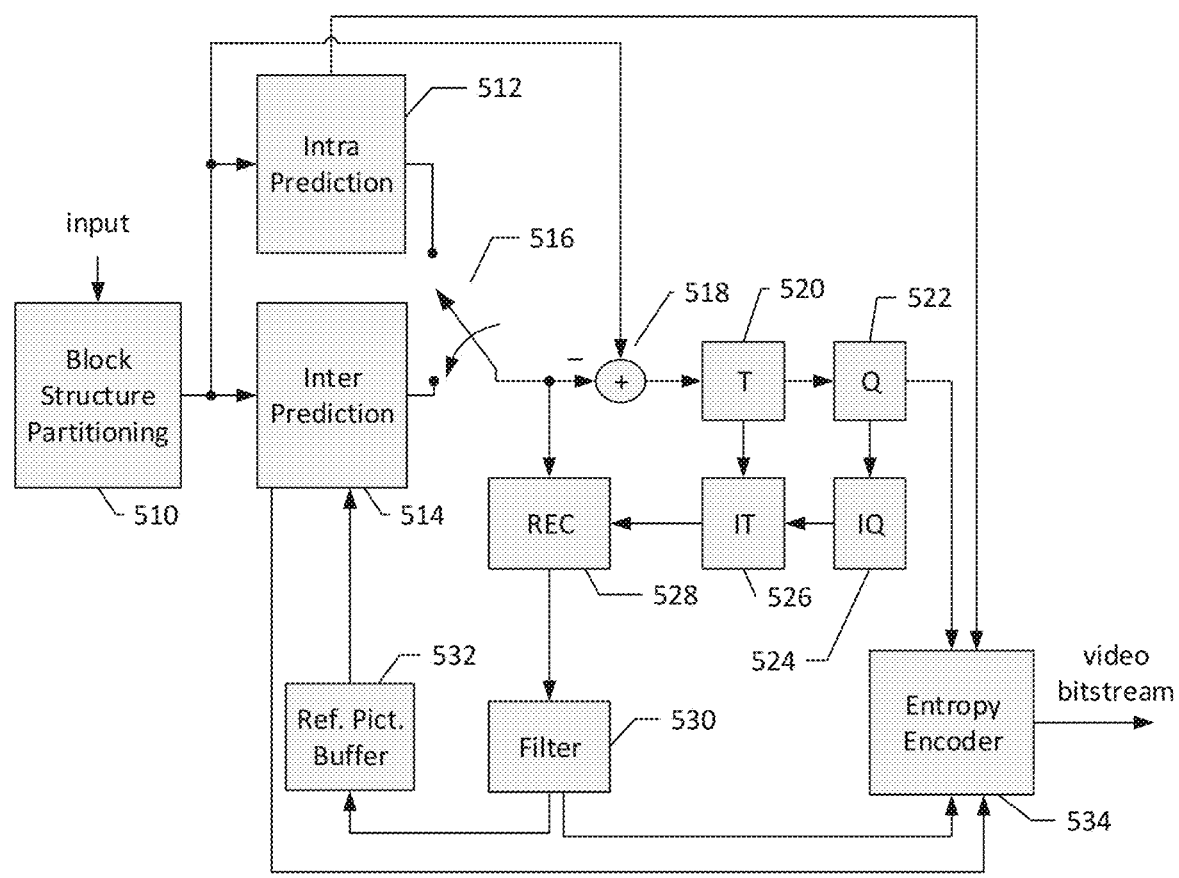
FIG. 5 illustrates an exemplary system block diagram for a video encoding system incorporating the video processing method according to embodiments of the present invention.

Embodiments of the video processing method are implemented in video encoders, video decoders, or both the video encoders and decoders. For example, the video processing method is implemented in a high-level syntax encoding module of the video encoder or in a high-level syntax decoding module of the video decoder. Alternatively, the video processing method is implemented in a circuit integrated to the high-level syntax encoding module of the video encoder or the high-level syntax decoding module of the video decoder. FIG. 5 illustrates an exemplary system block diagram for a Video Encoder 500 implementing various embodiments of the video processing method. A Block Structure Partitioning module 510 receives input data of video pictures and determines a block partitioning structure for each video picture to be encoded. Each leaf coding block in the current video picture is predicted by intra prediction in an Intra Prediction module 512 or by inter prediction in an Inter Prediction module 514 to remove spatial redundancy or temporal redundancy. The Intra Prediction module 512 provides intra predictors for the leaf coding block based on reconstructed video data of the current video picture. The Inter Prediction module 514 performs Motion Estimation (ME) and Motion Compensation (MC) to provide predictors for the leaf coding block based on video data from other video picture or pictures. A Switch 516 selects either the Intra Prediction module 512 or Inter Prediction module 514 to supply the predictor to an Adder 518 to form prediction errors, also called residues. The residues of each leaf coding block in the current video picture are divided into multiple transform blocks. The residues of each transform block are further processed by a Transform (T) module 520 followed by a Quantization (Q) module 522 to generate transform coefficient levels. In some embodiments of the present invention, the Transform Skip (TS) mode is enabled for the current video picture and the TS mode may be used to process the residues of a current transform block if the current transform block satisfies a size constraint. When the TS mode is used to process the current transform block, residues of the current transform block are not transform into a frequency domain. In one embodiment, the size constraint for enabling the TS mode is signaled in a SPS for a current video sequence only when the TS mode is enabled for the current video sequence. That is the size constraint is signaled in the SPS when a SPS level TS enabling flag signaled in the SPS is equal to 1. In another embodiment, the presence of a syntax element for deriving a minimum allowed QP value for the TS mode is conditioned on the SPS level TS enabling flag signaled in the SPS, wherein the syntax element for deriving a minimum allowed QP value for the TS mode is min_qp_prime_ts_minus4 or any other syntax element for deriving a minimum allowed QP value for the TS mode. The Entropy Encoder 534 also encodes prediction information and filter information to form a video bitstream. The video bitstream is then packed with side information. The transform coefficient levels of the current transform block are processed by an Inverse Quantization (IQ) module 524 and an Inverse Transform (IT) module 526 to recover the residual data of the current transform block. In cases when the TS mode is used to process the current transform block, an inverse transform operation is also skipped. As shown in FIG. 5, reconstructed video data are recovered by adding back the residual data to the selected predictor at a Reconstruction (REC) module 528. The reconstructed video data may be stored in a Reference Picture Buffer (Ref. Pict. Buffer) 532 and used by an Inter Prediction module 514 for prediction of other pictures. The reconstructed video data from the Reconstruction module 528 may be subject to various impairments due to the encoding processing, consequently, an In-loop Processing Filter 530 is applied to the reconstructed video data before storing in the Reference Picture Buffer 532 to further enhance picture quality.

Figure 6:
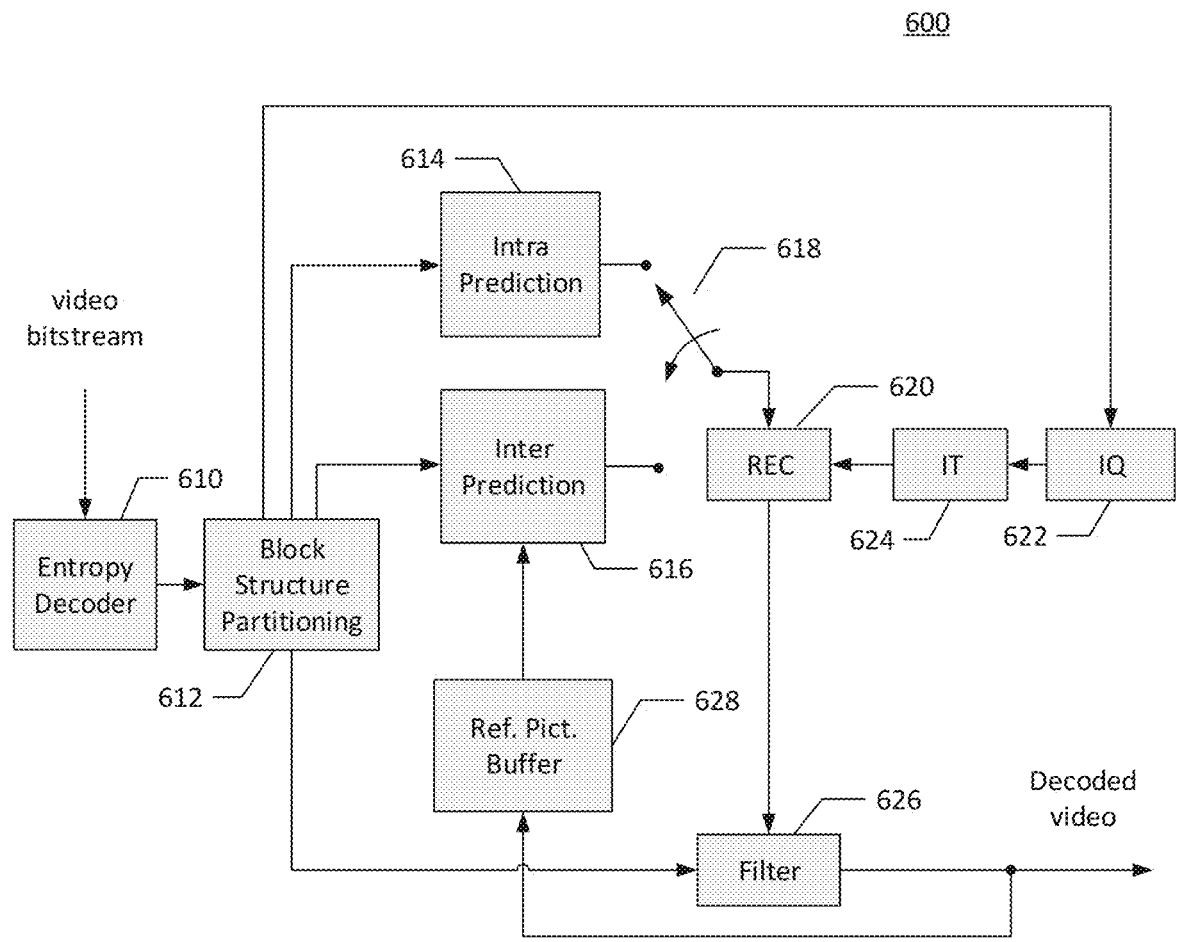
FIG. 6 illustrates an exemplary system block diagram for a video decoding system incorporating the video processing method according to embodiments of the present invention.

A corresponding Video Decoder 600 for decoding the video bitstream generated by the Video Encoder 500 of FIG. 5 is shown in FIG. 6. The input to the Video Decoder 600 is decoded by an Entropy Decoder 610 to parse and recover transform coefficient levels of each transform block and other system information. In some embodiments, the Entropy Decoder 610 first parses an enabling flag for the TS mode from a high-level syntax set such as a SPS, PPS, picture header, or slice header. The Entropy Decoder 610 parses a syntax element associated with a size constraint for enabling the TS mode from the SPS only if the enabling flag for the TS mode indicates the TS mode is enabled according to some embodiments of the present invention. In some embodiments, the Entropy Decoder 510 parses a syntax element from the high-level syntax set to derive a minimum allowed QP value for the TS mode if the enabling flag for the TS mode indicates the TS mode is enabled, wherein the syntax element is min_qp_prime_ts_minus4 or any other syntax element for deriving a minimum allowed QP value for the TS mode. A Block Structure Partitioning module 612 determines a block partitioning structure of each block in each video picture. The decoding process of the Decoder 600 is similar to the reconstruction loop at the Encoder 500, except the Decoder 600 only requires motion compensation prediction in an Inter Prediction module 616. Each leaf block in the video picture is decoded by either an Intra Prediction module 614 or Inter Prediction module 616, and a Switch 618 selects an Intra predictor or Inter predictor according to decoded mode information. The transform coefficient levels associated with a current transform block are recovered by an Inverse Quantization (IQ) module 622 and an Inverse Transform (IT) module 624 when the current transform block is not processed by the TS mode. The coefficient levels associated with a current transform block are recovered by the Inverse Quantization (IQ) module 622 when the current transform block is processed by the TS mode. The recovered residues are reconstructed by adding back the predictor in a Reconstruction (REC) module 620 to produce reconstructed video. The reconstructed video is further processed by an In-loop Processing Filter (Filter) 626 to generate final decoded video. If a currently decoded video picture is a reference picture, the reconstructed video of the currently decoded video picture is also stored in a Reference Picture Buffer 628 for later pictures in decoding order.

Various components of the Video Encoder 500 and Video Decoder 600 in FIG. 5 and FIG. 6 may be implemented by hardware components, one or more processors configured to execute program instructions stored in a memory, or a combination of hardware and processor. For example, a processor executes program instructions to control signaling or parsing a syntax element associated with a size constraint for enabling the TS mode when the TS mode is enabled. The processor is equipped with a single or multiple processing cores. In some examples, the processor executes program instructions to perform functions in some components in the Encoder 500 and Decoder 600, and the memory electrically coupled with the processor is used to store the program instructions, information corresponding to the reconstructed data, and/or intermediate data during the encoding or decoding process. The memory in some embodiments includes a non-transitory computer readable medium, such as a semi-conductor or solid-state memory, a Random Access Memory (RAM), a Read-Only Memory (ROM), a hard disk, an optical disk, or other suitable storage medium. The memory may also be a combination of two or more of the non-transitory computer readable mediums listed above. As shown in FIGS. 5 and 6, the Encoder 500 and Decoder 600 may be implemented in the same electronic device, so various functional components of the Encoder 500 and Decoder 600 may be shared or reused if implemented in the same electronic device. Any of the embodiments of the present invention may be implemented in the Entropy Encoder 534 of the Encoder 500, and/or the Entropy Decoder 610 of the Decoder 600. Alternatively, any of the embodiments may be implemented as a circuit coupled to the Entropy Encoder 534 of the Encoder 500 and/or the Entropy Decoder 610 of the Decoder 600, so as to provide the information needed by the Entropy Encoder 534 or the Entropy Decoder 610 respectively.

Embodiments of the video processing methods with one or more partition constraints may be implemented in a circuit integrated into a video compression chip or program code integrated into video compression software to perform the processing described above. For examples, determining of a block partitioning structure for the current block may be realized in program codes to be executed on a computer processor, a Digital Signal Processor (DSP), a microprocessor, or Field Programmable Gate Array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A video processing method in a video encoding or decoding system, comprising:
   receiving input video data of a current block in a current picture;
   determining whether a transform skip mode is enabled for the current block;
   signaling a syntax element associated with a size constraint for enabling the transform skip mode in a Sequence Parameter Set (SPS) referred to by the current picture when the transform skip mode is enabled or parsing a syntax element associated with a size constraint for enabling the transform skip mode from a SPS referred to by the current picture when the transform skip mode is enabled;
   determining whether the transform skip mode is applied to the current block in the current picture when the transform skip mode is enabled for the current block and the current block satisfies the size constraint for enabling the transform skip mode;
   processing residues associated with the current block according to the transform skip mode when the transform skip mode is applied to the current block or processing residues of the current block by a regular transform operation or regular inverse transform operation when the transform skip mode is not applied to the current block; and
   encoding or decoding the current block in the current picture.

2. The method of claim 1, wherein the step of determining whether a transform skip mode is enabled for the current block comprises parsing an enabling flag for the transform skip mode from a high-level syntax set, and the transform skip mode is enabled for the current block when the enabling flag is equal to 1.

3. The method of claim 2, wherein the high-level syntax set comprises one or a combination of the SPS, Picture Parameter Set (PPS), picture header, and slice header.

4. The method of claim 2, further comprising signaling or parsing a new syntax element in the SPS when the enabling flag is equal to 1, wherein the new syntax element indicates whether a slice level syntax element is present in slice headers referring to the SPS, and the slice level syntax element for a current slice is used to determine parsing residues of transform skip blocks in the current slice by a regular residual coding process or transform skip residual coding process.

5. The method of claim 1, further comprising signaling information related to a minimum allowed Quantization Parameter (QP) value associated with quantization of residues of transform blocks processed using the transform skip mode in the SPS when the transform skip mode is enabled for the current picture or parsing information related to a minimum allowed QP value associated with inverse quantization of a quantized residual signal of transform blocks processed using the transform skip mode from the SPS when the transform skip mode is enabled for the current picture.

6. The method of claim 1, wherein the syntax element associated with a size constraint for enabling the transform skip mode corresponds to information for deriving a maximum allowed block size for enabling the transform skip mode.

7. The method of claim 6, wherein the maximum allowed block size for enabling the transform skip mode relates to a number of total pixel samples, a width, or a height of a block.

8. The method of claim 6, wherein the maximum allowed block size for enabling the transform skip mode is less than or equal to a maximum allowed transform block size or a maximum allowed non-empty transform block size for coding transform blocks using the regular transform operation.

9. The method of claim 6, wherein the maximum allowed block size for enabling the transform skip mode for chroma transform blocks is less than or equal to a maximum allowed transform block size or a maximum allowed non-empty transform block size for coding the chroma transform blocks using the regular transform operation.

10. The method of claim 1, wherein the syntax element associated with a size constraint for the transform skip mode signaled in the SPS is for luma transform blocks, and a size constraint for enabling the transform skip mode for chroma transform blocks is derived from the size constraint for enabling the transform skip mode for the luma transform blocks.

11. The method of claim 10, wherein the size constraint for enabling the transform skip mode for the chroma transform blocks is set equal to a same value as the size constraint for enabling the transform skip mode for the luma transform blocks.

12. The method of claim 10, wherein the size constraint for enabling the transform skip mode for the chroma transform blocks is derived according to the size constraint for enabling the transform skip mode for the luma transform blocks and variables indicating down-sampling ratios associated with chroma bitplanes in horizontal and vertical dimensions.

13. The method of claim 1, further comprising signaling a second syntax flag in a high-level syntax set or parsing a second syntax flag from a high-level syntax set when the transform skip mode is enabled for the current block, wherein the second syntax flag is used to control whether one or more syntax elements related to the transform skip mode are present in a lower-level syntax set associated with each of lower-level video data units referring to the high-level syntax set.

14. The method of claim 13, wherein the high-level syntax set is the SPS, a Picture Parameter Set (PPS) referred to by the current picture, or a picture header associated with the current picture, and the lower-level syntax set is a picture header associated with the current picture or a slice header associated with a current slice in the current picture.

15. The method of claim 13, wherein the one or more syntax elements related to the transform skip mode are set to a default setting when the one or more syntax elements are not signaled in the lower-level syntax set.

16. The method of claim 15, wherein the default setting is derived from related parameters signaled in the high-level syntax set or the default setting is explicitly signaled by one or more syntax elements in the high-level syntax set.

17. An apparatus of processing video data in a video encoding or decoding system, the apparatus comprising one or more electronic circuits configured for:
   receiving input video data of a current block in a current picture;
   determining whether a transform skip mode is enabled for the current block;
   signaling a syntax element associated with a size constraint for enabling the transform skip mode in a Sequence Parameter Set (SPS) referred to by the current picture when the transform skip mode is enabled or parsing a syntax element associated with a size constraint for enabling the transform skip mode from a SPS referred to by the current picture when the transform skip mode is enabled;
   determining whether the transform skip mode is applied to the current block in the current picture when the transform skip mode is enabled for the current block and the current block satisfies the size constraint for enabling the transform skip mode;
   processing residues associated with the current block according to the transform skip mode when the transform skip mode is applied to the current block or processing residues of the current block by a regular transform operation or regular inverse transform operation when the transform skip mode is not applied to the current block; and
   encoding or decoding the current block in the current picture.

* * * * *